United States Patent [19]
Taylor

[11] Patent Number: 5,960,743
[45] Date of Patent: Oct. 5, 1999

[54] CLAY LITTER PRODUCT FOR AMMONIA CONTROL IN POULTRY PENS

[75] Inventor: Dennis R. Taylor, Chicago, Ill.

[73] Assignee: Oil-Dri Corporation of America, Chicago, Ill.

[21] Appl. No.: 09/003,936

[22] Filed: Jan. 7, 1998

[51] Int. Cl.⁶ .................................................. A01K 29/00
[52] U.S. Cl. ............................................................ 119/173
[58] Field of Search .................................... 119/171, 172, 119/173

[56] References Cited

U.S. PATENT DOCUMENTS

| | | | |
|---|---|---|---|
| 2,649,759 | 8/1953 | Gibbs | 119/1 |
| 4,405,354 | 9/1983 | Thomas, II et al. | 119/173 |
| 4,506,628 | 3/1985 | Stockel | 119/173 |
| 4,541,359 | 9/1985 | Hickey et al. | 119/1 |
| 4,656,150 | 4/1987 | de Buda | 119/173 |
| 4,949,672 | 8/1990 | Ratcliff et al. | 119/173 |
| 5,045,434 | 10/1991 | Wad et al. | 119/173 |
| 5,097,799 | 3/1992 | Heitfeld et al. | 119/173 |
| 5,395,585 | 3/1995 | Goldstein | 119/173 |
| 5,507,250 | 4/1996 | Reddy et al. | 119/173 |
| 5,634,431 | 6/1997 | Reddy et al. | 119/173 |

*Primary Examiner*—Thomas Price
*Attorney, Agent, or Firm*—Olson & Hierl, Ltd.

[57] ABSTRACT

A sulfuric acid-containing clay-based litter product useful in the control of ammonia generated by decaying excrement in poorly ventilated poultry brooding houses is provided. Raw clay is contacted with sulfuric acid to produce an acidulated clay which is then applied to the poultry brooding house floor in an amount sufficient to provide from about 0.0175 pounds of sulfuric acid to about 0.0875 pounds of sulfuric acid per square foot of poultry brooding house floor.

10 Claims, 1 Drawing Sheet

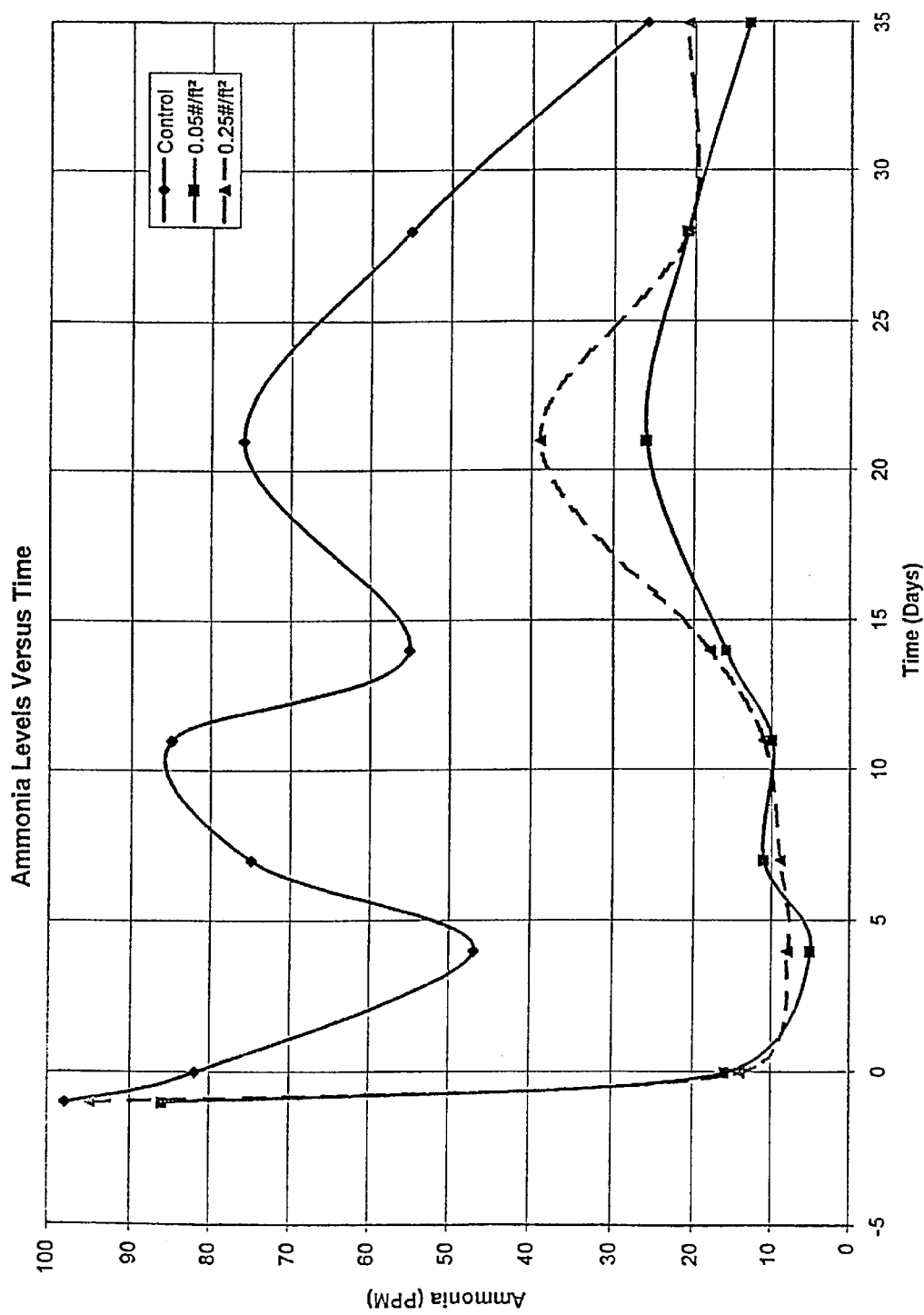

CLAY LITTER PRODUCT FOR AMMONIA CONTROL IN POULTRY PENS

FIELD OF THE INVENTION

This invention relates to a clay product which is useful as an ammonia control agent in poultry pens and to a method of making such a product.

BACKGROUND OF THE INVENTION

The commercial raising of poultry has traditionally been done in poultry brooding houses, i.e., confined areas having little ventilation where flocks are maintained singly in cages or as a group in large pens. The health and growth of broiler chickens in particular, are enhanced when the young birds are raised in large pens containing bedding or litter material. However, in the rearing of young birds, the maintenance and sanitary quality of the litter remain problematic issues.

For example, under the crowded and confined conditions of a poultry brooding house, the excrement of the young birds collects rapidly and becomes quite malodorous. Warmth and moisture from the excrement create an environment that supports rampant bacterial growth in the soiled poultry litter. In turn, the bacteria enzymatically digest the excrement, and in so doing create ammonia by-products which are released into the environment. When ammonia levels exceed about 25 ppm, the normal respiratory function of the young birds is impaired.

Under these low ventilation conditions present in poultry brooding houses, the ammonia levels can climb to more than 40–90 parts per million (ppm) and can reduce growth performance of the young birds. In addition, when one or more of the young birds become diseased, the illness can be spread easily through the flock by the excrement or contaminated litter which the birds sometimes ingest. These issues are of serious concern to the poultry farmer.

In order to create a more favorable environment for the young birds, numerous materials have been utilized as poultry litter with limited success. Wood shavings, straw, and sawdust have been used for this purpose, though each is easily dampened and slow to dry, thereby creating a favorable breeding environment for microorganisms. Also, these materials when soiled can be fatal to the young birds if ingested. Another drawback to these materials is the frequency with which they have to be removed and replenished along with the time and expense involved in doing so.

Peat moss is another material that has been used as an alternative to wood shavings or straw as litter. Though peat moss has a high absorption capacity, it readily breaks down to a dust which is ineffective as litter. Likewise, diatomaceous earth has been tried, though like peat moss, quickly decomposes to a dust which can irritate the pulmonary system of the young birds. Also, the dust can cause the young birds develop breast blisters and to become crippled by the caking action of the dust upon the damp pads of the birds feet.

In addition to the litter itself, chemical additives have been developed which can reduce bacterial growth in soiled litter when mixed in with such litter. By this bacteriostatic action, these additives concurrently reduce the amount of ammonia generated from the decaying poultry excrement. Examples of such chemical additives for litter include phosphoric acid, sodium bisulfate, alum, and monocalcium phosphate.

There are drawbacks to these prior art additives, however. For instance, most additives are expensive and difficult to apply to the litter bedding or require activation for use. Sodium bisulfate containing products, for example, must be activated by misting with water to achieve and maintain effectiveness. Phosphoric acid, for example, is commonly applied to litter by directly spraying the litter with a 50% aqueous solution of phosphoric acid onto the litter which is situated on the floor of the poultry brooding house at a time period immediately before new chicks are introduced to the pen. This operation requires specialized equipment (e.g., high pressure spraying systems) and presents hazards to the workers who are on site. Usually, firms specializing in this type of work are contracted for the procedure, and as such, are costly to the poultry farmer.

The present invention provides an acidulated clay-based litter which, when used in poultry brooding houses, controls the amount of ammonia present and improves the growth performance of the young birds.

SUMMARY OF THE INVENTION

A clay litter product treated with sulfuric acid is effective in the control of ammonia arising from the decomposition of excrement in poultry brooding houses. The litter product is made by contacting a dried or calcined raw clay with sulfuric acid to produce an acidulated clay containing at least about 15 weight percent sulfuric acid.

The inventive acidulated clay product beneficially allows a poultry breeder to control ammonia levels in pens of broiler and poultry housing facilities, especially during cold weather when controlling air ventilation is limited or economically impractical. The inventive acidulated clay product also beneficially increases the quality of young birds reared on the acidulated clay-litter products. Further, the acidulated clay product of this invention requires no activation, can be used directly and applied employing conventional equipment.

BRIEF DESCRIPTION OF THE DRAWING

FIG. 1 is a graphical comparison of the average reduction in ammonia levels in parts per million (ppm) over a period of 35 days by sulfuric acid-containing products of this invention applied to poultry litter at about 0.05 pounds and at about 0.25 pounds per square foot against the untreated litter control.

DETAILED DESCRIPTION OF THE PREFERRED EMBODIMENTS

A clay litter product useful in the control of ammonia generated by the decomposition of poultry excrement in brooding houses is disclosed. The clay litter product is made by contacting a dried or calcined raw clay with sulfuric acid. The resultant acidulated clay product is useful for ammonia control in a poultry brooding house.

Raw clay can be from the hormite mineral group, the smectite mineral group and mixtures thereof. The hormite group of minerals includes the palygorskite and sepiolite varieties which have silicate ring, ribbon, or chain structures. The smectite mineral group includes the montmorillonites, montronites, hectorite, and saponite varieties, which are constituted by stacked layers of an octahedral sheet of alumina and one or more sandwiching tetrahedral sheets of silica. Other minerals which are neither hormite nor smectite which may be included in the raw clay are opal, apatite, calcite, feldspar, kaolinite, mica, quartz and gypsum amongst others. Preferably the raw clay is montmorillonite clay.

The particle size of the raw clay can be in the range of from about 12 mesh to about 100 mesh, U.S. Sieve Series, preferably in the range of from about 16 mesh to about 60 mesh, U.S. Sieve Series. The moisture content of the raw clay can be in the range of from about 1 to about 15% by weight.

Examples of useful clay products for acidification by the method of this invention, without being limited thereto, are Low Volatile Matter Mississippi (LVM-MS), Low Volatile Matter Georgia (LVM-GA), Regular Volatile Matter Georgia (RMV-GA) and the like.

The raw clay is acidulated by the addition of sulfuric acid, usually as an aqueous or concentrated sulfuric acid solution. The concentration of the aqueous sulfuric acid solution preferably is about 50% by weight and of a concentrated sulfuric acid preferably is from about 93 to about 95% by weight. The sulfuric acid content of the resultant acidulated clay is at least about 15 percent by weight, preferably in the range of from about 25 to about 35% by weight. The sulfuric acid can be contacted with the clay in any convenient manner, such as by mixing, spraying or the like. The pH (5% slurry) of the acidulated clay product preferably is not more than about 1.5, more preferably not more than about 1.

The acidulated clay product can then be applied directly to the existing floor bedding or litter in pens of poultry brooding houses. Preferably, the acidulated clay product is spread substantially uniformly over the top surface of the floor bedding or litter by employing a fertilizer spreader or the like or by hand (gloved) broadcasting. The acidulated clay can be applied to a poultry pen preferably in an amount in the range of from about 0.05 to about 0.25 lbs/ft$^2$ to provide from about 0.0175 to about 0.0875 lbs sulfuric acid/ft$^2$ poultry brooding house floor.

The following Examples further illustrate the inventive product and method and are not intended to be limiting.

EXAMPLE 1

Acidulated Clay Litter Product in Ammonia Control Capacity

This example illustrates the reduction in the ammonia level generated from poultry litter in pens of commercial broiler chickens (Gallus domesticus) under simulated field conditions using the acidulated clay-based litter product of this invention at two dosage levels as compared to an untreated litter control.

Acidulated attapulgite/montimorillonite Low Volatile Matter-Georgia (LVM-GA), 12×48 mesh, U.S. Sieve Series, was manufactured by combining about 47.75 pounds of the raw clay with about 75 pounds of substantially concentrated (93%) sulfuric acid to provide a sulfuric acid-containing clay having about 36 wt. % sulfuric acid, and a pH of about 1.3 (5% aqueous slurry).

In this test, normal, healthy, day old, male broiler chicks were obtained from a commercial hatchery (Cobb-Vantress) and placed in brooder pens in an environmentally controlled poultry housing facility. The poultry housing facility was 38×43 feet in size and contained 20 pens, each pen size being 3.5×12 feet with a concrete floor. The facility was divided into three randomized blocks of pens: 1 block of 10 pens for untreated litter controls, 1 block each of 5 pens for two separate treated litter pen groups. The block of untreated control pens were physically separated from the block of treated litter pen groups in a manner that maintained separation of traffic and air flow. The treated litter pen groups shared a common air source but had a "vapor" barrier separating the pens.

A positive pressure ventilation system was used, and heat was provided by one house gas heater and a gas brooder in each pen and adjusted as necessary to maintain bird comfort. Otherwise, the housing conditions simulated field conditions by achieving a pre-test initial minimum ammonia level of about 80 to 100 parts per million (PPM). Ammonia levels were measured using a Matheson Toxic Gas Detector, Model 8014KA and Precision Gas Detector Tubes #105SC (5–260 ppm).

Each brooder pen had two hanging tube feeders of approximately 17-inch diameter each and one automatic hanging bell drinker of approximately 14 inch diameter. Bird migration between pens was prevented by assuring that no openings greater than about 1 inch existed for approximately 18 inches in height between the pens by placing a plywood barrier for approximately the first 18 inches from the floor. Floor space per bird was about 0.7 square feet.

Used poultry litter (i.e, containing poultry excrement) was placed in each of the pens. One day before the arrival of the chicks, the litter in the test pens was top-dressed by broadcasting acidulated clay product over the top of the litter employing a fertilizer spreader and the litter in the control pens was not top-dressed. For the test pens, one sulfonated attapulgite/montmorillonite clay litter treatment (Test A) was prepared by applying about 0.05 pounds per square foot (lbs/ft$^2$) of pen litter floor surface and a second similar litter treatment (Test B) was prepared by applying about 0.25 pounds per square foot (lbs/ft$^2$) of pen litter floor surface. The pen assignments and number of birds employed are summarized in Table 1.

TABLE 1

| Treatment | Litter | Treatment Level (lbs./ft$^2$) | No. of Pens | Pen* Nos. | No. Birds Per Pen | Total No. of Birds |
|---|---|---|---|---|---|---|
| None | (Control) | n/a | 10 | 1–5, 16–20 | 60 | 600 |
| A | Sulfonated attapulgite/ montmorillonite clay | 0.05 lbs | 5 | 6–10 | 60 | 300 |
| B | Super sulfonated attapulgite/ montmorillonite clay | 0.25 lbs | 5 | 11–15 | 60 | 300 |
| Total | | | 20 | | | 1200 |

*Pen No. assignments were computer generated.

Ammonia levels in the air at the bird level were measured in four related pens of each treatment group and control group on the day prior to the litter treatment (day-1), on the day following litter treatment before bird placement (day 0), and on day 4, day 7, day 11, day 14, day 21, day 28, day 35 and day 48 of the test after bird placement. The results are shown in Table 2 and the average results over a period of 35 days are graphically shown in FIG. 1.

TABLE 2

Ammonia Levels in Parts Per Million at Various Intervals During a 48-Day Period

| Litter Treatment | Pen. No. | (Day −1) | (Day 0) | (Day 4) | (Day 7) | (Day 11) | (Day 14) | (Day 21) | (Day 28) | (Day 35) | (Day 48) |
|---|---|---|---|---|---|---|---|---|---|---|---|
| None | 2 | 100 | 80 | 40 | 70 | 80 | 65 | 85 | 60 | 30 | 90 |
| (Control) | 4 | 115 | 90 | 60 | 70 | 90 | 60 | 80 | 55 | 25 | 75 |
|  | 17 | 90 | 80 | 40 | 80 | 80 | 50 | 60 | 45 | 30 | 70 |
|  | 19 | 90 | 80 | 50 | 80 | 90 | 45 | 80 | 60 | 30 | 85 |
| Average |  | 99 | 83 | 48 | 75 | 85 | 55 | 76 | 55 | 29 | 80 |
| A | 6 | 80 | 10 | 5 | 10 | 10 | 10 | 25 | 20 | 10 | 30 |
|  |  | 80 | 15 | 5 | 10 | 10 | 15 | 35 | 20 | 15 | 35 |
|  |  | 85 | 15 | 5 | 15 | 10 | 15 | 20 | 20 | 10 | 35 |
|  | 9 | 100 | 15 | 5 | 10 | 10 | 15 | 25 | 25 | 15 | 40 |
| Average |  | 86 | 14 | 5 | 11 | 10 | 14 | 26 | 21 | 13 | 35 |
| B | 12 | 85 | 10 | 5 | 5 | 10 | 15 | 35 | 20 | 20 | 35 |
|  | 13 | 115 | 45 | 10 | 10 | 10 | 20 | 35 | 20 | 25 | 35 |
|  | 14 | 85 | 15 | 5 | 5 | 10 | 20 | 45 | 25 | 20 | 40 |
|  | 15 | 85 | 10 | 10 | 15 | 15 | 15 | 40 | 20 | 20 | 40 |
| Average |  | 93 | 13 | 8 | 9 | 11 | 18 | 39 | 21 | 21 | 38 |

Throughout the test, the birds received water ad libitum from the automatic bell drinker. For approximately the first three days of chick age, a floor-placed gallon drinker was also placed in each pen. Drinkers were checked twice daily and cleaned as needed to assure a clean water supply to the birds at all times. The birds were fed ad libitum throughout the test via the two hanging tube feeders per pen and for approximately the first 5 days, a chick feeder tray was also placed in each pen. All chicks received starter diet feeds from day 0 to day 21, grower diet feeds from day 21 to day 42 and finisher feed diets from day 42 to day 49. The birds were previously vaccinated at the hatchery for Mareks and were vaccinated for Newcastle and Infectious Bronchitis (NCB) at approximately 1.5× the normal rate, at approximately 15 days of age via the drinking water. No other vaccinations or treatments, except the feed additives were administered during the study.

The facility, pens and birds were observed twice daily for general flock condition, lighting, water, feed, ventilation and unanticipated events. All mortalities or removals from day 0 to the end of the study were recorded and mortalities were necropsied to determine the probable cause of death. At approximately 7 days following the NCB vaccination and at the conclusion of day 49, 6 birds per pen were removed and necropsied to score the thoracic air sacs. These results are summarized in Table 3.

TABLE 3

Summary of Individual Bird Thoracic Air Sac Score on Days 22 and 49

| | Thoracic Air Sac Score | | |
|---|---|---|---|
| Treatment | Day 22 | Day 49 | Average |
| None (Control) | 1.65 | 1.23 | 1.44 |
| A | 0.20 | 0.23 | 0.215 |
| B | 0.20 | 0.33 | 0.265 |

Each treatment on each day represents 6 birds from each pen.
Thoracic air sac scores:
0 = clear
1 = cloudy
2 = plaque formation
3 = severe plaque formation The results show that both acidulated clays improved the thoracic air sac score values.

At the conclusion of the study, all birds in three pens for each litter treatment and from the control were processed to evaluate quality, i.e., carcass grade and condemnations, based on USDA standards, and breast blisters and foot pad lesions were scored. The results are shown in Table 4.

TABLE 4

Influence of Litter Treatment on Incidence of Breast Blisters and Foot Pad Lesions.

| | | | Number of Birds Per Pen | | | | | | | | | | | |
|---|---|---|---|---|---|---|---|---|---|---|---|---|---|---|
| | | | Carcass grade of: | | | | Breast Blister Score of: | | | | Foot Pad Score of: | | | |
| Litter Treatment | Pen No. | No. of Birds | A | B | C | Condemned | 0 | 1 | 2 | NS* | 0 | 1 | 2 | 3 |
| None | 4 | 46 | 21 | 18 | 1 | 6 | 23 | 10 | 8 | 5 | 2 | 15 | 25 | 4 |
| (Control | 18 | 45 | 25 | 15 | 0 | 5 | 25 | 5 | 10 | 5 | 2 | 7 | 22 | 14 |
|  | 19 | 45 | 30 | 13 | 0 | 2 | 30 | 4 | 9 | 2 | 0 | 7 | 23 | 15 |
| Total |  | 136 | 76 | 46 | 1 | 13 | 78 | 19 | 27 | 12 | 4 | 29 | 70 | 33 |
| Percent |  |  | 55.88% | 33.82% | 0.74% | 9.56% | 57.35% | 13.97% | 19.85% | 8.82% | 2.94% | 21.32% | 51.47% | 24.26% |
| A | 7 | 39 | 29 | 9 | 0 | 1 | 29 | 7 | 2 | 1 | 26 | 13 | 0 | 0 |
|  | 8 | 44 | 34 | 8 | 0 | 2 | 34 | 7 | 1 | 2 | 32 | 12 | 0 | 0 |
|  | 9 | 44 | 40 | 4 | 0 | 0 | 37 | 5 | 2 | 0 | 20 | 21 | 3 | 0 |
| Total |  | 127 | 103 | 21 | 0 | 3 | 100 | 19 | 5 | 3 | 78 | 46 | 3 | 0 |

TABLE 4-continued

Influence of Litter Treatment on Incidence of Breast Blisters and Foot Pad Lesions.

Number of Birds Per Pen

| Litter Treatment | Pen No. | No. of Birds | Carcass grade of: | | | Con- demned | Breast Blister Score of: | | | | Foot Pad Score of: | | | |
|---|---|---|---|---|---|---|---|---|---|---|---|---|---|---|
| | | | A | B | C | | 0 | 1 | 2 | NS* | 0 | 1 | 2 | 3 |
| Percent | | | 81.1% | 16.54% | 0.0% | 2.36% | 78.74% | 14.96% | 3.94% | 2.36% | 61.42% | 36.22% | 2.36% | 0.0% |
| B | 12 | 42 | 31 | 6 | 5 | 32 | 2 | 3 | 5 | 2 | 10 | 22 | 8 | |
| | 13 | 42 | 33 | 8 | 0 | 1 | 33 | 6 | 2 | 1 | 0 | 7 | 24 | 11 |
| | 14 | 45 | 35 | 8 | 0 | 2 | 35 | 2 | 6 | 2 | 1 | 7 | 25 | 12 |
| Total | | 129 | 99 | 22 | 0 | 8 | 100 | 10 | 11 | 8 | 3 | 24 | 71 | 31 |
| Percent | | | 76.74% | 17.05% | 0.0% | 6.2% | 77.52% | 7.75% | 8.53% | 6.2% | 2.33% | 16.6% | 55.04% | 24.03% |

Grades = USDA standards
Breast blister scores:
0 = none,
1 = small ($\geq 1/4$ inch),
2 = large ($\geq 1/4$ inch)
*NS = not scored
Foot pad score:
0 = normal (no burn, scab or lesion),
1 = pad burn (dermis only),
2 = pad scab, (healing) on one or both feet,
3 = pad lesion (open sore), both feet In summation, the results show that both inventive acidulated clay products successfully reduced the ammonia levels in the pens and improved the Grade quality of the chicks raised on these litters by improving thoracic air sac scores and breast blister scores. Normal foot pad lesion scores for the sulfonated attapulgite/montmorillonite clay treatment "A" group were improved over those of the control group while those of the sulfonated attapulgite/montmorillonite clay treatment "B" group were substantially equivalent to those of the control group.

EXAMPLE 2

Reduction of Ammonia Levels from Poultry Excrement by the Use of Various Clay Litter Products This example illustrates the effectiveness of a series of litter treatments with acidulated clay products of this invention in controlling the level of ammonia arising from poultry excrement compared to the effectiveness of commercial clay products, commercial bisulfate-containing clay litter treatment and a negative control (untreated) litter.

As shown in Table 6, the commercial clay products were Flo-Fre Mississippi (Set #1), and Flo-Fre Georgia (Set #2). Acidulated clay treatment products were Low Volatile Matter Mississippi (LVM-MS), (8/16 particle size, U.S. Sieve Series) having 35% propionic acid by wt. content (Set #3); Regular Volatile Matter Georgia (RVM-GA), (8/16 particle size, U.S. Sieve Series) having 3% sulfuric acid by wt. content (Set #3); Low Volatile Matter Mississippi (16/30 particle size, U.S. Sieve Series) having 17.5% by wt. sulfuric acid (Set #4); Low Volatile Matter Mississippi (16/30 particle size, U.S. Sieve Series) having 17.5% by wt. sulfuric acid which had been aged for two weeks (Set #5); and Low Volatile Matter Mississippi (16/30 particle size, U.S. Sieve Series) having 17.5% by wt. sulfuric acid which was used "fresh" (Set #5). The commercial sodium bisulfate-containing Poultry Litter Treatment was PLT™, (NaHSO$_4$) sold by Jones-Hamilton of Wallbridge, Ohio.

In these evaluations, poultry excrement from a commercial broodhouse was placed to a depth of two inches in a series of separate one cubic foot environmental chambers. As indicated in Test Set #1–4 of Table 4, one chamber contained a negative control (no litter treatment) and each other selected chamber separately contained a top dressing treatment of clay-based litter, applied at about 0.125 to about 0.5 lbs/ft$^2$, as shown. In Test Set #5 of Table 4, nine selected chambers separately contained either a top dressing treatment of acidified clay-based litter, fresh or aged two weeks, and applied at about 0.25 lbs/ft$^2$ or the commercial bisulfate-containing control (PLT™, (NaHSO$_4$)), applied at about 0.05 lbs/ft$^2$, tested dry, "activated" with water according to the manufacturer's instructions for the commercial control product and three selected chambers separately contained one of the foregoing applied amounts of litter treatment mixed into the poultry excrement.

Four female chicks, obtained from a commercial hatchery, were placed into each chamber and were fed and watered ad libitum over a 14 day period. A positive pressure ventilation system was used to achieve uniform atmospheric conditions in each of the chambers. Ammonia concentration (ppm) was monitored by removing an air sample from each of the chambers, taken approximately six inches above bird height, employing Gastec™ dosimeter tubes (No. 3D). The results are shown in Table 6.

TABLE 6

Results of Tests on Reduction of Ammonia Levels in Poultry Houses

| Test | Product | Average NH$_3$ (ppm)[1] | Treatment Level (lbs/ft$^2$) |
|---|---|---|---|
| Set #1 | Control | 31.1 | 0 |
| | Flo-Fre MS | 35.4 | 0.125 |
| | Flo-Fre MS | 32.8 | 0.25 |
| Set #2 | Control | 38 | 0 |
| | Flo-Fre GA | 33 | 0.25 |
| | Flo-Fre GA | 31 | 0.50 |
| Set #3 | Control | 38 | 0 |
| | 8/16 LVM-MS/ 35% propionic acid | 23[2] | 0.25 |
| | 8/16 RVM-GA/ | 31 | 0.25 |

TABLE 6-continued

Results of Tests on Reduction of Ammonia Levels in Poultry Houses

| Test | Product | Average NH$_3$ (ppm)[1] | Treatment Level (lbs/ft$^2$) |
|---|---|---|---|
| Set #4 | 3% sulfuric acid Control | 46 | 0 |
| | 16/30 LVM-MS/ 17.5% sulfuric acid | 6 | 0.25 |
| Set #5 | 16/30 LVM-MS/ 17.5% sulfuric acid (aged 2 wks) | 26 (1 hr/dry) | 0.25 |
| | 16/30 LVM-MS/ 17.5% sulfuric acid (aged 2 wks) | 25.6 (1 hr/wet) | 0.25 |
| | 16/30 LVM-MS/ 17.5% sulfuric acid (aged 2 wks) | 6 (20 hr/wet) | 0.25 |
| | 16/30 LVM-MS/ 17.5% sulfuric acid (aged 2 wks) | 18 (20 hr/wet/mixed) | 0.25 |
| | 16/30 LVM-MS/ 17.5% sulfuric acid (fresh) | 23.2 (1 hr/dry) | 0.25 |
| | 16/30 LVM-MS/ 17.5% sulfuric acid (fresh) | 19.2 (1 hr/wet) | 0.25 |
| | 16/30 LVM-MS/ 17.5% sulfuric acid (fresh) | 6 (20 hr/wet) | 0.25 |
| | 16/30 LVM-MS/ 17.5% sulfuric acid (fresh) | 20 (20 hr/wet/mixed) | 0.25 |
| | PLT™ (NaHSO$_4$) | 35.6 (1 hr/dry) | 0.05 |
| | PLT™ (NaHSO$_4$) | 22.8 (1 hr/wet) | 0.05 |
| | PLT™ (NaHSO$_4$) | 15 (20 hr/wet) | 0.05 |
| | PLT™ (NaHSO$_4$) | 118 (20 hr/wet/mixed) | 0.05 |

[1]·Average of 4 determinations over 14 day period unless otherwise indicated.
[2]·Strong odor of propionic acid.

The foregoing data from Set #'s 4 and 5 show that the inventive acidulated clay, LVM-MS (16/30 particle size) having 17.5% sulfuric acid by wt., was effective in reducing the level of ammonia in the chamber to not more than about 26 ppm and was more effective over time than the commercially available bisulfate-containing PLT™ product (see, e.g., Set #5, 20 hr data). In addition, no extra water was needed to activate the present inventive litter as compared to the commercial product. Lastly, the inventive litter was effective in controlling ammonia even when mixed into the poultry excrement.

EXAMPLE 3

Stability of Acidulated Clay Product

This example illustrates the acidic stability of an acidulated clay product of this invention, based on its pH.

Low Volatile Matter Mississippi (LVM-MS) clay was loaded to its maximum capacity of about 36 wt. % sulfuric acid by mixing the raw clay with either diluted (50%) sulfuric acid to provide a Regular Sulfonated Montmorillonite Clay product (RSMC) or concentrated (about 94 wt. %) sulfuric to provide a Concentrated Sulfonated Montmorillonite Clay product (CSMC). Both acidulated clay products were initially analyzed for pH (5% aqueous slurry). (day 0) and then stored at ambient room temperature and humidity for a period of 17 days, during which storage period, the pH of the acidulated clay products was analyzed again at day 3, day 10 and day 17 of storage. The results are shown in Table 7.

TABLE 7 pH of Sulfonated Montmorillonite Clay (RSMC) and Super Sulfonated Montmorillonite Clay (CSMC) Over a Period of 17 Days

| pH at | day 0 | day 3 | day 10 | day 17 |
|---|---|---|---|---|
| RSMC | 0.85 | 0.37 | 0.36 | 0.1 |
| CSMC | 0.55 | 0.25 | 0.39 | 0.0 |

The data show that the initial pH value of the RSMC product was slightly higher than that of the CSMC product but was substantially the same as that of the CSMC product by day 10 and thereafter. Thus, both acidulated products of this invention were judged acid stable, (i.e. remained highly acidic) on storage aging.

I claim:

1. A method of making a clay litter product effective in the control of ammonia arising from poultry excrement comprising contacting a selected raw clay with at least about 15 weight percent sulfuric acid based on the weight of the clay to produce an acidulated clay.

2. The method of claim 1 wherein the raw clay is a member of the group consisting of hormite, smectite, and mixtures thereof.

3. The method of claim 1 wherein the raw clay is montmorillonite clay.

4. The method of claim 1 wherein the raw clay has a particle size in the range of from about 12 mesh to about 100 mesh U.S. Sieve Series.

5. The method of claim 1 wherein the moisture content of the raw clay is in the range of from about 1 to about 15% by weight.

6. The method of claim 1 wherein the sulfuric acid is applied as an aqueous solution.

7. The method of claim 1 wherein the amount of sulfuric acid applied to the clay is in the range of from about 15 to about 40% by weight.

8. The method of claim 1 wherein the amount of sulfuric acid applied to the clay is about 35% by weight.

9. The clay litter product made according to the method of claim 1.

10. A method for controlling ammonia in a poultry pen which comprises spreading onto the poultry pen floor a sulfuric acid-containing clay in an amount sufficient to provide from about 0.05 pounds to about 0.25 pounds of sulfuric acid-containing clay per square foot of the floor, the sulfuric acid-containing clay containing at least about 15 weight percent sulfuric acid, based on the weight of the clay.

* * * * *

UNITED STATES PATENT AND TRADEMARK OFFICE
CERTIFICATE OF CORRECTION

PATENT NO. : 5,960,743
DATED : October 5, 1999
INVENTOR(S) : Dennis R. Taylor

It is certified that error appears in the above-indentified patent and that said Letters Patent is hereby corrected as shown below:

Cols. 5-6, in TABLE 2, 4th column under the heading "(Day 0)", 4th line from bottom, "45" should be -- 15 --.

Cols. 7-8, in TABLE 4-continued:
        6th column, under the heading "C", line 2, "5" should be -- 0 --.
        7th column, under the heading "Condemned", line 2, "32" should be -- 5 --.
        8th column, under the heading "0", line 2, "2" should be -- 32 --.
        9th column, under the heading "1", line 2, "3" should be -- 2 --.
        10th column, under the heading "2", line 2, "5" should be -- 3 --.
        11th column, under the heading "NS*", line 2, "2" should be -- 5 --.
        12th column, under the heading "0", line 2, "10" should be -- 2 --.
        13th column, under the heading "1", line 2, "22" should be -- 10 --.
        14th column, under the heading "2", line 2, "8" should be -- 22 --.
        15th column, under the heading "3", line 2, insert "8".
        In the footnotes, line 4, "($\geq$ ¼ inch)" should be -- ($\leq$ ¼ inch)

Signed and Sealed this

Twentieth Day of June, 2000

Attest:

Q. TODD DICKINSON

*Attesting Officer*      *Director of Patents and Trademarks*